May 22, 1962 W. HORBERG 3,035,788

TAPE REEL CLAMP

Filed May 4, 1960

INVENTOR.
William Horberg
BY
Johnson and Kline
ATTORNEYS 3,035,788
Patented May 22, 1962

3,035,788

TAPE REEL CLAMP

William Horberg, Trumbull, Conn., assignor to Horberg Grinding Industries, Inc., Bridgeport, Conn., a corporation of Connecticut Filed May 4, 1960, Ser. No. 26,900
9 Claims. (Cl. 242—68.3)

This invention relates to means for securing a reel to a spindle for rotation thereby. More specifically, it pertains to a reel clamp for clamping to a spindle a reel having a central opening substantially larger than the spindle.

Normally, tape reels are formed with a central opening adapted to slidably receive a spindle to be driven thereby and are locked to a spindle abutment, which may be a turntable or the like, for maintaining driving relation with the spindle. While this conventional type of tape reel presents few problems, large capacity reels of the type having an enlarged hub and a central opening of greater dimension than the spindle present the problem of positioning and maintaining them in driving relation with the spindle.

The present invention overcomes the problem presented by large capacity reels or reels having similar large central openings by providing means for removably positioning and clamping the reels in driving relationship with the spindle.

According to the invention, the positioning and clamping means includes a clamping member for positioning the reel and pressing it against the spindle abutment, a collet adapted to grip the spindle and means cooperating between the collet and the clamping member for causing the collet to grip the spindle and simultaneously forcing the clamping member against the reel to press the latter against the abutment.

It is an object of the invention to provide a reel clamp, for use with large capacity reels, adapted to position and lock the reel in driving relation with a rotatable spindle.

It is also an object of the invention to provide a clamp for a reel, having a central opening of greater dimension than the spindle to which it is to be secured, which positions the reel and presses it against a spindle abutment, the clamp being locked to the spindle against movement relative thereto.

Another object of the invention is to provide a reel clamp having means for positioning the reel relative to a spindle and pressing it against a spindle abutment and means for positively locking the positioning and pressing means against movement relative to the spindle.

Still another object of the invention is to provide a clamp having means for positioning and locking a reel to a spindle of lesser diameter than the central opening of the reel which includes means for positively locating the positioning and locking means relative to the spindle.

It is further an object of the invention to provide a clamp for securing a reel having a large central opening to a spindle of relatively smaller diameter which is readily operated to clamp and unclamp the reel, embodies few parts of simple structure and is of such rugged character it will function over a long period of time with freedom from all difficulties.

Other objects and advantages of the invention will be apparent from the specification and claims when considered in connection with the attached sheet of drawings, illustrating one form of the invention, wherein like character represent like parts and in which:

Figure 1:
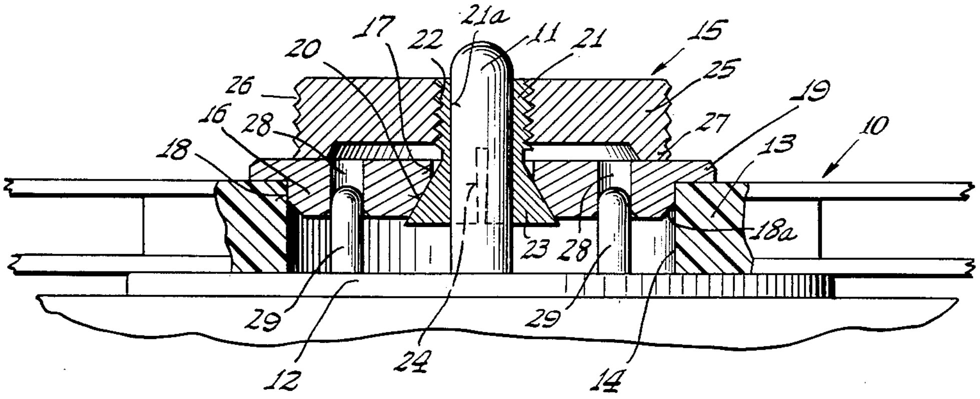
FIGURE 1 is a fragmentary elevational view, partially broken away and in section, of a reel secured to a spindle by a clamp embodying the invention.
Figure 2:
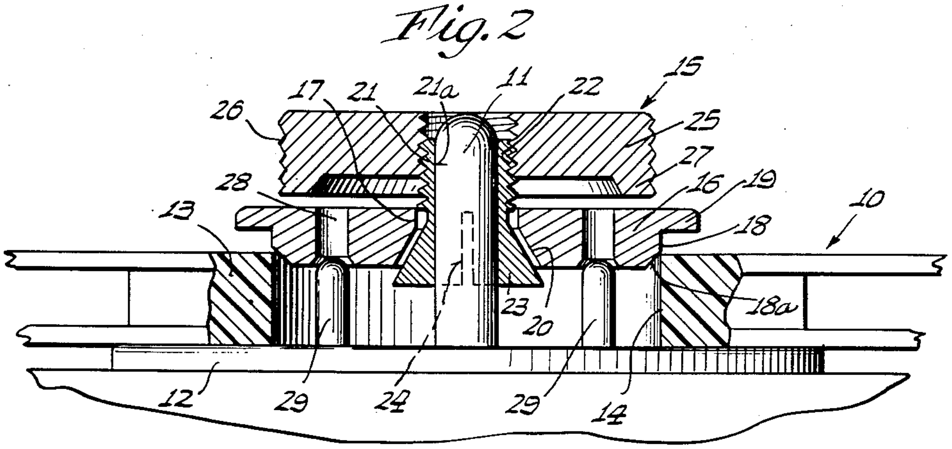
FIG. 2 is a view similar to FIG. 1, but showing the clamp prior to being moved to reel clamping position.
Figure 3:
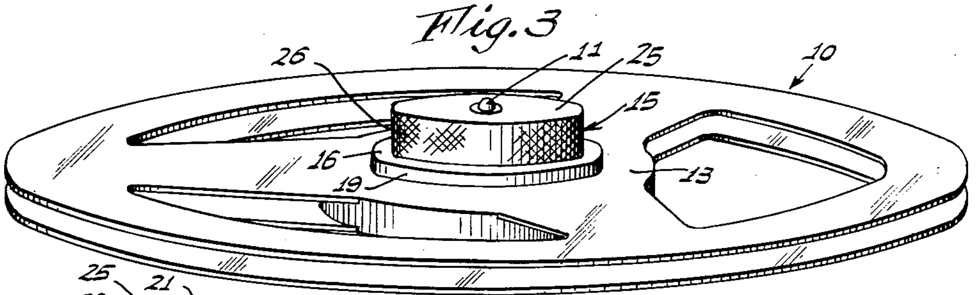
FIG. 3 is a perspective view of a reel secured to a spindle according to the invention.

Referring now to the drawings for a detailed description of the invention, in FIGS. 1 to 3 a tape reel 10 is shown secured to a rotatable spindle 11 having an abutment 12 which may be a turntable or the like. The reel, which includes a hub portion 13 having a central opening 14 is adapted to be positioned concentrically with the spindle 11 and driven thereby to carry a tape or the like (not shown) in the conventional manner.

Heretofore, tape reels have normally been formed with a central opening of substantially the same diameter as the spindle on which they are to be mounted, so that they slidably receive the spindle in driving engagement, and have been locked against rotative movement relative to the spindle by means such as fins or similar projections, secured to the spindle or its abutment, that engage the reel.

The present invention relates to a different type of tape reel, one wherein the central opening is of substantially greater diameter than the spindle on which it is mounted, and is directed to means for positioning and securing such a reel in driving engagement with the spindle. According to the invention, as shown in the drawings, the reel 10 is secured to the spindle 11 and its abutment 12 by a tape reel clamp, generally indicated by the numeral 15, the clamp positively positioning the reel and locking it against movement with respect to the spindle.

The tape reel clamp 15, according to the illustrated embodiment of the invention, includes a clamping member 16 having a central opening 17 adapted to loosely surround the spindle for longitudinal movement relative thereto and includes a portion 18 adapted to engage the hub 13 of the reel by insertion in the central opening 14 thereof for positioning the reel with respect to the spindle. The clamping member 16 includes a flange 19 adapted to overlie the hub portion 13 of the reel and presse the same against abutment 12 of the spindle. As shown in the drawings, the central opening 17 of the clamping member is outwardly flared adjacent one surface thereof, as at 20, for a purpose to be hereinafter explained.

A collet 21 having a bore **21*a* and being adapted to be slidably positioned on the spindle 11 extends through the central opening 17 of clamping member 16. The collet, which may be of conical structure according to conventional practice, is shown here in its preferred form as including a threaded shank 22 having an outwardly flared head portion 23 disposed adjacent one side of the clamping member 16. As seen most clearly in FIGS. 1 and 2, the outwardly flared head portion 23 of the collet is adapted to mate with the outwardly flared portion 20 of central opening 17 of clamping member 16 when the tape reel clamp 15 is in operable position relative to reel 10 and spindle 11 (see FIG. 1). As will be readily understood by those conversant with the art, when the collet 21 is drawn into engagement with the clamping member 16, such as in the illustrated embodiment of the invention when the head portion 23 thereof mates with the outwardly flared portion 20 of the central opening of the clamping member, the collet which is split, as at 24, closes on the spindle 11** to grip the same thereby preventing relative movement between the spindle and the collet.

Disposed adjacent one side of clamping member 16 and threadedly engaging the shank 22 of collet 21 are means 25 in the form of an adjusting nut or the like, which are adapted to draw the collet through clamping member 16 into such engagement therewith that the collet is closed on the spindle to grip the same. The adjusting nut 25, which may be knurled or similarly formed along its peripheral edge, as at 26, to facilitate adjustment is provided with a depending peripheral skirt 27 adapted to engage the outer surface of clamping member 16 as the adjusting nut is turned to draw the collet through the clamping member.

Referring now particularly to FIGS. 1 and 2 for the operation of tape reel clamp 15, the tape reel 10 is positioned so that the spindle 11 extends through the enlarged central opening of the reel and the latter abuts the abutment 12 of the spindle. Thereafter, as shown in FIG. 2, the collet and clamping member 16 are disposed over spindle 11 and moved downwardly on the spindle so that the flange 19 of the clamping member engages the hub portion 13 of the reel as shown in FIG. 1. As the clamping member is moved downwardly into engagement with the reel portion 18 thereof enters the enlarged central opening of the reel and positions the same concentrically with the spindle. In order to facilitate the insertion of the portion 18 into central opening 14 of the reel and to cam the reel into predetermined position relative to the spindle, the leading edge of the portion 18 is beveled as at **18*a*. Subsequently the adjusting nut is turned to draw the collet, through the threaded engagement therewith, upwardly through the central opening 17 of the clamping member so that the outwardly flared head portion 23 mates with the outwardly flared portion 20 of the central opening to close the collet on the spindle for gripping the same. Simultaneously with the closing of the collet, the depending skirt 27 of the means 25 engages the clamping member 16 and presses the flange 19 against the hub of the reel so that the reel is locked against abutment 12** of the spindle.

While the structure heretofore described may be sufficient to position and lock tape reel 10 relative to spindle 11 and the abutment 12 thereof, in the illustrated and preferred form of the invention, means are provided for preventing rotative movement or slippage between the clamping member 16 and the spindle and abutment. As shown in FIGS. 1 and 2, the clamping member 16 is formed with a plurality of radially disposed openings 28 extending parallel to the axis of central opening 17 and adapted to receive the fingers or similar projections 29 that are formed integral with the abutment 12 of many of the conventional apparatus in use today. The engagement of the fingers 29 in the openings 28 aligns the clamping member 16 in predetermined position relative to the spindle 11 and locks the entire tape reel clamp 10 in driving relationship with the spindle and its abutment.

Figure 4:
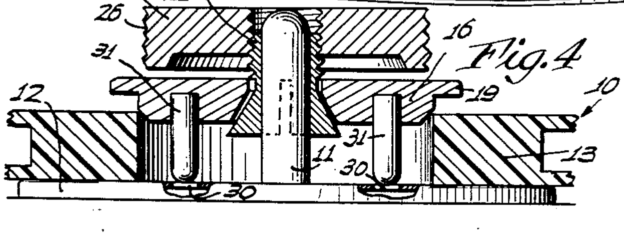
FIG. 4 is a view similar to FIG. 2, but showing an alternative form of the invention.

In FIG. 4 an alternative form of the invention shown in FIGS. 1 and 2 is illustrated for use with apparatus wherein the spindle abutment 12 is not provided with fingers 29 but in lieu thereof is formed with openings 30 disposed radially about the spindle 11. In this embodiment of the invention the clamping member 16 is provided with a plurality of downwardly extending fingers 31 which, on positioning the tape reel clamp in clamping position relative to the reel 10, engage in the openings 30 of the abutment 12 to align the clamp with the spindle and lock it in driving relationship therewith.

Thus, among others, the several objects and advantages of the invention as aforenoted are achieved. Obviously numerous changes in the structure may be restored to without departing from the spirit of the invention as defined by the claims.

I claim:

1. Means for clamping a reel having a hub and an enlarged central opening to a rotatable spindle of smaller diameter than said central opening having an abutment against which the reel is adapted to be pressed, said means comprising a clamping member having a central opening therethrough adapted to surround the spindle and having a peripheral portion adapted to overlie and engage the hub portion of the reel for clamping the reel to the abutment, said clamping member having means for positioning the reel with respect to the spindle, a collet extending through the central opening of said clamping member and adapted to be slidably carried by the spindle and means connected to said collet having peripherally depending means for engaging said clamping member for drawing the collet into engagement with the clamping member to close the collet on the spindle and simultaneously pressing the peripheral portion of the clamping member against the hub to lock the reel against the abutment.

2. Means for clamping a reel having a hub and an enlarged central opening to a rotatable spindle of smaller diameter than said central opening having an abutment against which the reel is adapted to be pressed, said means comprising a clamping member having a central opening therethrough adapted to surround the spindle and having a portion adapted to engage the hub portion of the reel for clamping the reel to the abutment, means for positioning the reel with respect to the spindle, a collet having an enlarged head portion extending through the central opening of said clamping member and adapted to be slidably carried by the spindle and means connected to said collet and engaging said clamping member solely adjacent the clamping portion thereof for drawing said head portion of the collet into engagement with the clamping member to close the collet on the spindle for axially locking the clamping member thereto and simultaneously pressing the clamping portion of the clamping member against the hub to lock the reel against the abutment.

3. Means for clamping a reel having a hub and an enlarged central opening to a rotatable spindle of smaller diameter than said central opening having an abutment against which the reel is adapted to be pressed, said means comprising a clamping member having a central opening therethrough adapted to suround the spindle and having a portion adapted to engage the hub portion of the reel for positioning the reel with respect to the spindle, said clamping member being formed with a peripheral portion overlying and engaging the hub of the reel for clamping the reel against the abutment, a collet having an outwardly flared head portion extending through the central opening of said clamping member and adapted to be slidably carried by the spindle and means connected to said collet and engaging said clamping member adjacent to and inwardly from the said peripheral portion of said clamping member for drawing said head portion of the collet into engagement with the clamping member to cam closed the collet on the spindle for locking the clamping member against axial movement relative to the spindle and simultaneously pressing the peripheral portion of the clamping member against the hub for locking the reel against the abutment.

4. Means for clamping a reel having a hub and an enlarged central opening to a rotatable spindle of smaller diameter than said central opening having an abutment against which the reel is adapted to be pressed, said means comprising a clamping member having a central opening therethrough adapted to surround the spindle and having a portion adapted to engage the hub portion of the reel for positioning the reel with respect to the spindle, said clamping member being formed with a peripheral portion overlying and engaging the hub for clamping the reel against the abutment, a collet extending through the central opening of said clamping member and adapted to be slidably carried by the spindle, said collet having an outwardly flared head portion disposed adjacent one side of said clamping member, and means adjustably connected to said collet and engaging the opposite side of said clamping member adjacent to and inwardlly from the said peripheral portion of said clamping member for drawing the collet through the clamping member so that said flared head portion engages with said clamping member to cam closed the collet on the spindle for locking the clamping member against axial movement relative to the spindle and simultaneously pressing the peripheral portion of the clamping member against the hub for locking the reel against the abtutment.

5. Means for clamping a reel having a hub and an enlarged central opening to a rotatable spindle of smaller diameter than said central opening having an abutment against which the reel is adapted to be pressed, said means comprising a clamping member having a central opening therethrough adapted to surround the spindle and having a portion adapted to engage the hub portion of the reel for positioning the reel with respect to the spindle, said clamping member being formed with a peripheral portion overlying and engaging the hub for clamping the reel against the abutment, means adapted to cooperate between said clamping member and said abutment for aligning the former with the latter and locking it therewith in driving relationship, a collet extending through the central opening of said clamping member and adapted to be slidably carried by the spindle and means connected to said collet and engaging said clamping member adjacent to and inwardly from the said peripheral portion of said clamping member for drawing the collet into engagement with the clamping member to close the collet on the spindle for locking the clamping member against axial movement relative to the spindle and simultaneously pressing the peripheral portion against the hub for locking the reel against the abutment.

6. Means for clamping a reel having a hub and an enlarged central opening to a rotatable spindle of smaller diameter than said central opening having an abutment against which the reel is adapted to be pressed, said means comprising a clamping member having a central opening therethrough adapted to surround the spindle and having a portion adapted to engage the hub portion of the reel for positioning the reel with respect to the spindle, said clamping member including a flange adapted to overlie and engage said hub portion, a collet extending through the central opening of said clamping member and adapted to be slidably carried by the spindle, said collet having an outwardly flared head portion disposed adjacent one side of said clamping member and means threadedly connected to said collet and engaging the opposite side of said clamping member adjacent to and inwardly from the said flange of said clamping member for drawing the collet through the clamping member so that said flared head portion engages with said clamping member to cam closed the collet on the spindle for locking the clamping member against axial movement relative to the spindle and simultaneously pressing the flange against said hub portion to lock the reel against the abutment.

7. In combination with a spindle having an abutment connected thereto and adapted to rotate with said spindle; a reel adapted to be mounted on said spindle and having an enlarged hub portion provided with a relatively large central opening, means clamping said reel to said spindle and abutment for rotation thereby, said means comprising a clamping member having a central opening therethrough surrounding the spindle and having a portion to engage the hub portion of said reel to position the reel with respect to said spindle, said clamping member being formed with a peripheral portion overlying and engaging said hub for clamping said reel against said abutment, a collet slidably carried by said spindle and extending through the central opening of said clamping member and means connected to said collet having a depending skirt portion engaging said clamping member adjacent to and inwardly from the said peripheral portion of said clamping member for simultaneously drawing said collet into engagement with said clamping member to close the collet on said spindle to grip the same for locking the clamping member against axial movement relative to said spindle and pressing said peripheral portion of said clamping member against the hub portion to lock said reel against said abutment.

8. In combination with a spindle having an abutment connected thereto and adapted to rotate with said spindle; a reel adapted to be mounted on said spindle and having an enlarged hub portion provided with a relatively large central opening, means clamping said reel to said spindle and abutment for rotation thereby, said means comprising clamping member having a central opening therethrough surrounding the spindle and having a portion to engage the hub portion of said reel to position the reel with respect to said spindle, means cooperating between said abutment and said clamping member for locking the latter in driving relation with the former, a collet slidably carried by said spindle and extending through the central opening of said clamping member, said collet having means adapted to be engaged by said clamping member for camming the collet closed on said spindle to grip the same, and means connected to said collet and engaging said clamping member for drawing the collet through the central opening of said clamping member to engage the camming means therewith so that said collet is closed on said spindle and simultaneously pressing said clamping member against the hub portion to lock said reel against said abutment.

9. In combination with a spindle having an abutment connected thereto and adapted to rotate with said spindle; a reel adapted to be mounted on said spindle and having an enlarged hub portion provided with a relatively large central opening, means clamping said reel to said spindle and abutment for rotation thereby, said means comprising a clamping member having a central opening therethrough surrounding the spindle and having a portion to engage the hub portion of said reel to position the reel with respect to said spindle, said clamping member including a flange adapted to overlie the hub portion of said reel for pressing the same against said abutment, means cooperating between said clamping member and said abutment for locking the former in driving relation with the latter, a collet slidably carried by said spindle and extending through the central opening of said clamping member and means connected to said collet and engaging said clamping member for simultaneously drawing the collet through the central opening of said clamping member to close the collet on said spindle to grip the same and pressing the flange of said clamping member against the hub portion of said reel to lock said reel against said abutment.

References Cited in the file of this patent

UNITED STATES PATENTS 2,727,702 Latincich ---------------- Dec. 20, 1955

FOREIGN PATENTS 906,837 France ------------------ May 28, 1945